(12) United States Patent
Wang et al.

(10) Patent No.: US 10,211,881 B2
(45) Date of Patent: Feb. 19, 2019

(54) SYSTEMS AND METHODS FOR IMPLEMENTING ENERGY-EFFICIENT ETHERNET COMMUNICATIONS

(71) Applicant: BROADCOM CORPORATION, Irvine, CA (US)

(72) Inventors: Peiqing Wang, Laguna Beach, CA (US); Linghsiao Wang, Irvine, CA (US); Mehmet Vakif Tazebay, Irvine, CA (US)

(73) Assignee: Avago Technologies International Sales PTE. Limited, Singapore (SG)

( * ) Notice: Subject to any disclaimer, the term of this patent is extended or adjusted under 35 U.S.C. 154(b) by 559 days.

(21) Appl. No.: 13/963,962

(22) Filed: Aug. 9, 2013

(65) Prior Publication Data

US 2014/0043954 A1 Feb. 13, 2014

Related U.S. Application Data

(60) Provisional application No. 61/681,557, filed on Aug. 9, 2012.

(51) Int. Cl.
*H04B 3/32* (2006.01)
*H04L 12/12* (2006.01)

(52) U.S. Cl.
CPC .............. *H04B 3/32* (2013.01); *H04L 12/12* (2013.01); *Y02D 50/40* (2018.01); *Y02D 50/42* (2018.01)

(58) Field of Classification Search
CPC .............................. Y02B 60/34; Y02B 60/35
USPC ......................................................... 370/201
See application file for complete search history.

(56) References Cited

U.S. PATENT DOCUMENTS

| 2009/0163084 | A1* | 6/2009 | Straka | H01R 13/6658 439/676 |
| 2010/0322078 | A1* | 12/2010 | Wang | H04L 12/12 370/241 |
| 2012/0287829 | A1* | 11/2012 | Chang | H04L 5/16 370/296 |
| 2015/0036699 | A1* | 2/2015 | Yu | H04J 3/0638 370/535 |

* cited by examiner

*Primary Examiner* — Asad M Nawaz
*Assistant Examiner* — Saad A. Waqas
(74) *Attorney, Agent, or Firm* — Morgan, Lewis & Bockius LLP (57) ABSTRACT

Systems and methods for implementing an Energy-Efficient Ethernet (EEE) communication are provided. In some aspects, a method includes identifying an EEE signal configured to be communicated via a first set of wires. The method also includes processing the EEE signal such that the processed EEE signal is configured to be communicated via a second set of wires. The second set of wires including fewer wires than the first set of wires. The method also includes communicating the processed EEE signal via the second set of wires.

19 Claims, 4 Drawing Sheets

FIG. 4

SYSTEMS AND METHODS FOR IMPLEMENTING ENERGY-EFFICIENT ETHERNET COMMUNICATIONS

CROSS-REFERENCES TO RELATED APPLICATIONS

The present application claims the benefit of U.S. Provisional Patent Application Ser. No. 61/681,557, titled "Systems and Methods for Implementing Energy Efficient Ethernet Communications between Electronic Devices," filed on Aug. 9, 2012, which is hereby incorporated by reference in its entirety for all purposes.

FIELD

The subject technology generally relates to Ethernet communications and, in particular, relates to systems and methods for implementing Energy-Efficient Ethernet communications between electronic devices.

BACKGROUND

The current Institute of Electrical and Electronics Engineers (IEEE) 802.3 1000Base-T Energy-Efficient Ethernet (EEE) standard is based on 4-pair full-duplex operations. However, the use of four pairs of wires under this standard may introduce crosstalk between the wires. It is therefore desirable to implement the EEE standard using a reduced set of wires to reduce and/or eliminate the crosstalk.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, well-known structures and techniques have not been shown in detail so as not to obscure the subject technology.

EEE provides an optional mode of operation for Ethernet that allows Ethernet nodes to save power by disabling certain functionality (e.g., transmit and receive functions) over periods of low link utilization. The EEE mode of operation, which may be referred to as a low power idle (LPI) mode, can be supported over various Ethernet medium access control (MAC) and physical (PHY) layer configurations.

According to various aspects of the subject technology, the EEE standard, which is incorporated by reference herein, can be implemented for various reduced pair Ethernet applications, including automobile Ethernet applications and other broadband applications. For example, such applications may use only one or two pairs for full-duplex data communications (e.g., single pair 250 megabits per second full-duplex digital communications). Aspects of the subject technology allow improvements over the EEE standard to make EEE operation more robust, especially in the presence of harsh noise (e.g., electromagnetic interference) for certain applications.

Figure 1:
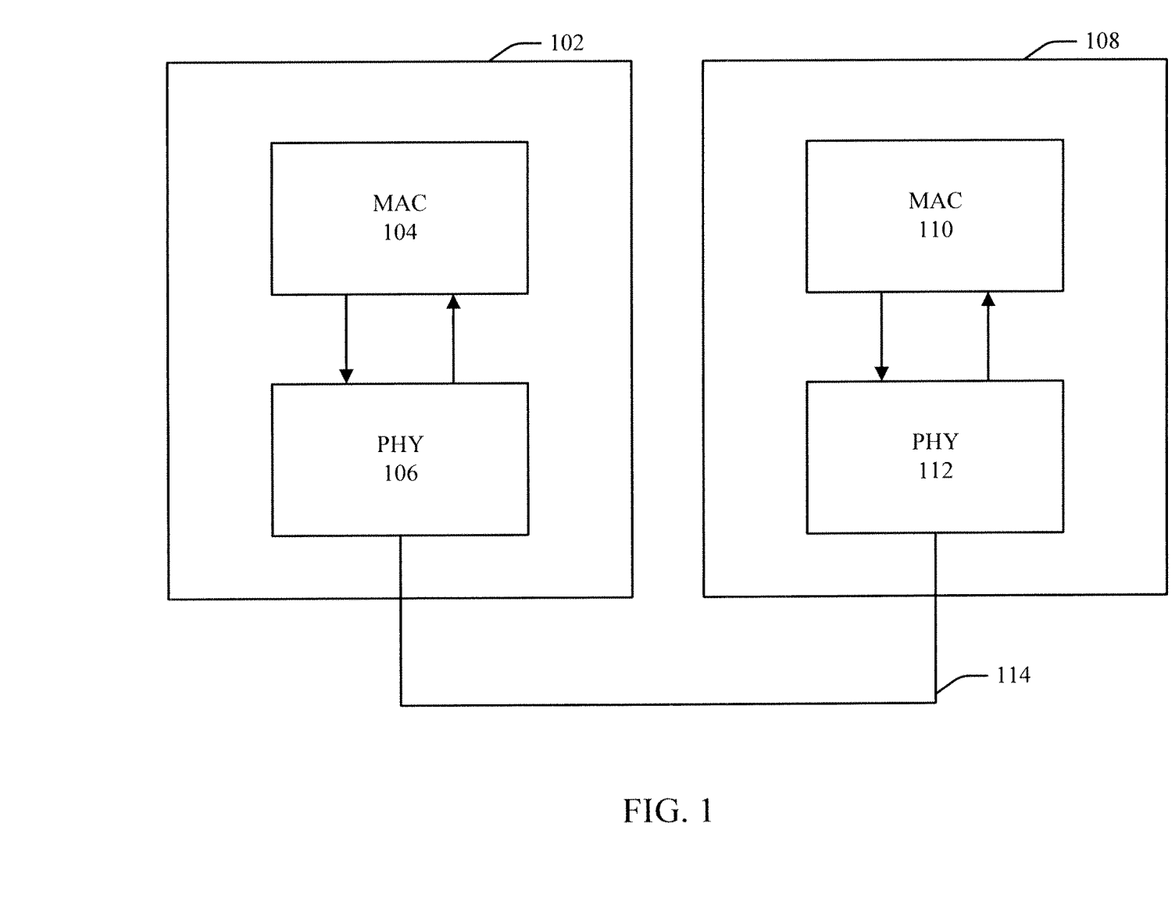
FIG. 1 illustrates electronic devices in communication with one another, in accordance with various aspects of the subject technology.

FIG. 1 illustrates electronic devices 102 and 108 in communication with one another, in accordance with various aspects of the subject technology. Electronic devices 102 and 108 may each be computers, routers, switches, hubs, and/or other suitable electronic instruments for communicating with one another. Electronic device 102 comprises MAC layer 104 and physical (PHY) layer 106, while electronic device 108 comprises MAC layer 110 and PHY layer 112.

MAC layer 104, PHY layer 106, MAC layer 110, and PHY layer 112 enable communications between electronic devices 102 and 108 via transmission media 114. For example, PHY layers 106 and 112 may perform one or more of the following functions: bit-by-bit or symbol-by-symbol delivery; providing a standardized interface to physical transmission media, modulation, line coding, bit synchronization in synchronous serial communication, start-stop signaling and flow control in asynchronous serial communication; circuit switching; multiplexing (e.g., establishment and termination of circuit switched connections); carrier sense and collision detection utilized by certain multiple access protocols; equalization filtering, training sequences, pulse shaping and other signal processing of physical signals; forward error correction (e.g., bitwise convolutional coding); and bit-interleaving and other channel coding. PHY layers 106 and 112 are not limited to performing these functions, but may perform other suitable functions for enabling communications between electronic devices 102 and 108. MAC layers 104 and 110 may perform one or more of the following functions: receive/transmit normal frames; half-duplex retransmission and backoff functions; append/check frame check sequence (FCS); interframe gap enforcement; discard malformed frames; append(tx)/remove(rx) preamble, SFD, and padding; and half-duplex compatibility (e.g., append(tx)/remove(rx) MAC address). MAC layers 104 and 110 are not limited to performing these functions, but may perform other suitable functions for enabling communications between electronic devices 102 and 108.

Electronic devices 102 and 108 may implement the EEE standard to establish Energy-Efficient Ethernet communication between one another. The EEE standard facilitates power reduction in several ways. In 100 megabits per second (Mbps), 1 gigabits per second (Gbps), and 10 Gbps speed data links, for example, energy may be used to keep PHY layers 106 and 112 transmitters on most of the time, if not all the time. Energy can be conserved by putting these transmitters into a sleep/idle mode when data is not being sent. By sending LPI indication signals for a specified time, the transmitters can be turned off. The LPI signals may be sent periodically to refresh the sleep/idle mode. When there is data to transmit, a normal idle signal may be sent to wake a corresponding transmitter up before data is due to be sent.

In one or more implementations, the data link between electronic devices 102 and 108 may be considered to be always operational, as their respective receive signal circuits may remain active even when the transmit path is in sleep/idle mode.

Since the EEE standard is based on 4-pair full-duplex operations, aspects of the subject technology implement the EEE standard using a reduced set of wires to reduce and/or eliminate crosstalk. The EEE standard may be implemented using a reduced set of wires based on the current EEE PhyControl state diagram defined by the EEE standard. Transmission media 114, for example, may be a cable that comprises a reduced set of wires compared to the four pairs of wires used under the EEE standard.

Figure 2:
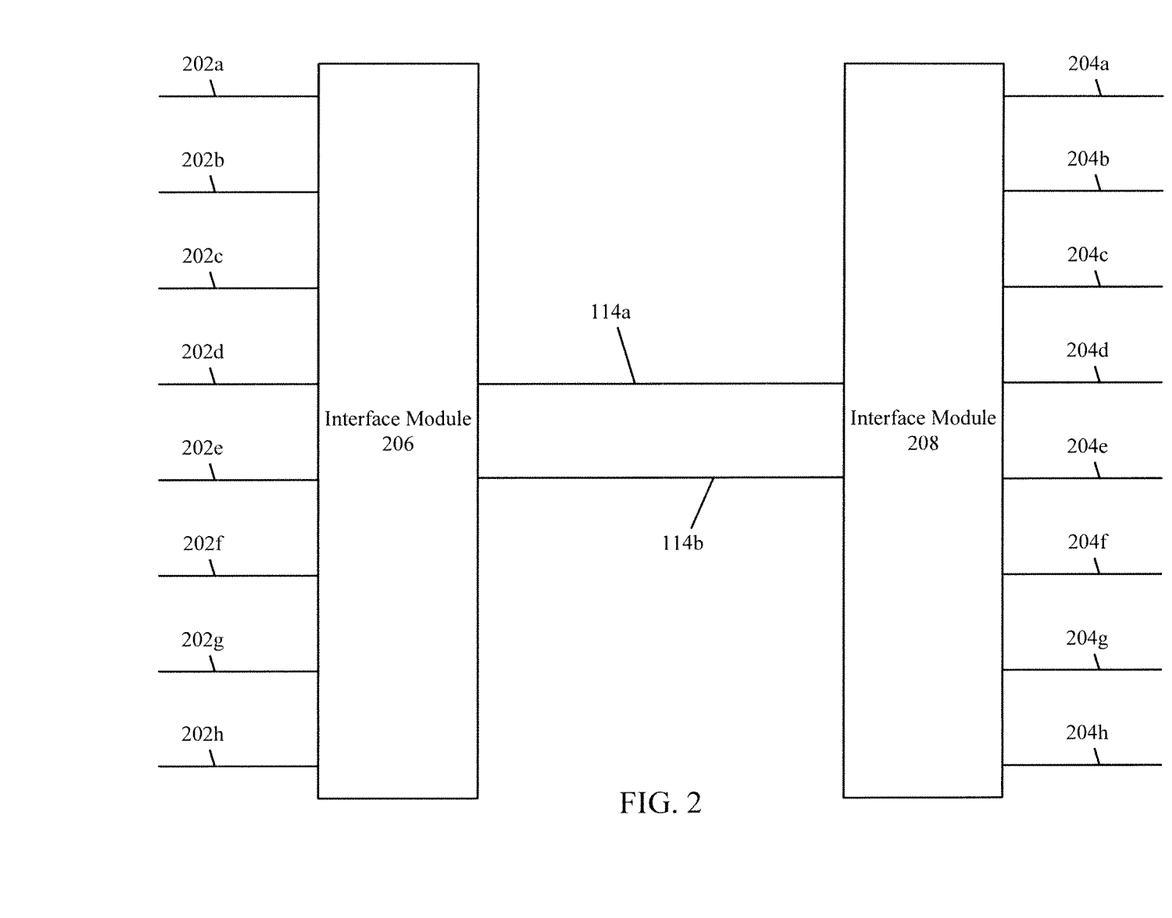
FIG. 2 illustrates an example of interface modules that may be used to adapt EEE signals used under the EEE standard to a reduced set of wires, in accordance with various aspects of the subject technology.

FIG. 2 illustrates an example of interface modules 206 and 208 that may be used to adapt EEE signals (e.g., LPI signals used under the EEE standard) to the reduced set of wires, in accordance with various aspects of the subject technology. Interface module 206, for example, may be part of electronic device 102 (e.g., PHY layer 106), while interface module 208 may be part of electronic device 108 (e.g., PHY layer 112). In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
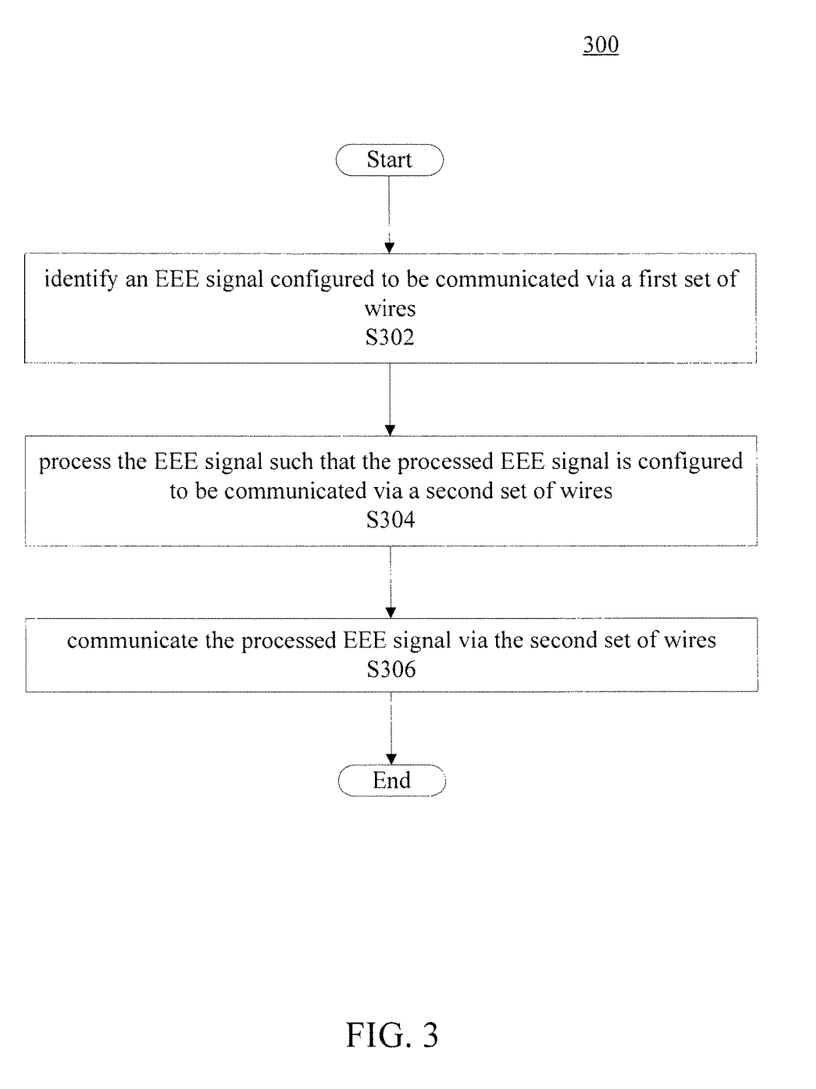
FIG. 3 illustrates an example of a method for implementing EEE communication, in accordance with various aspects of the subject technology.

FIG. 3 illustrates an example of method 300 for implementing EEE communication, in accordance with various aspects of the subject technology. Interface module 206, for example, may be used to implement method 300. However, method 300 may also be implemented by other modules, such as interface module 208. Although method 300 is described herein with reference to the examples of FIGS. 1 and 2, method 300 is not limited to these examples. Furthermore, although method 300 is illustrated in the order shown in FIG. 3, it is understood that method 300 may be implemented in a different order.

According to certain aspects of the subject technology, interface module 206 identifies an EEE signal configured to be communicated via a first set of wires (S302). For example, the EEE signal configured to be communicated via the first set of wires may comprise a plurality of portions each configured to be transmitted via a respective one of the first set of wires. In one or more implementations, interface module 206 may receive the EEE signal from MAC layer 104 via eight wires 202 (e.g., shown in FIG. 2 as 202a-202h). The EEE signal, for example, may be a low power idle signal, a low power idle initiation request, a low power idle acknowledgment, a low power refresh signal, a low power quiet signal, a low power wake signal, a send zero signal, a signal for synchronizing one or more low power states between electronic device 102 and electronic device 108, a signal for changing the one or more states, and/or any other signal for implementing EEE communication between electronic devices 102 and 108.

Interface module 206 may process the received EEE signal such that the processed EEE signal is configured to be communicated via a second set of wires (S304). The second set of wires may include fewer wires than the first set of wires. As shown in FIG. 2, interface module 206 processes the received EEE signal such that it is configured to be transmitted via transmission media 114 (e.g., shown in FIG. 2 as two wires 114a and 114b). These wires, for example, may be an unshielded twisted pair of wires. In some aspects, interface module 206 may process the EEE signal by routing, switching, splitting, duplicating, delaying, muxing, encoding, scrambling, modulating, mapping, and/or modifying the received EEE signal. For example, interface module 206 may comprise one or more multiplexers, demultiplexers, and/or other suitable components for processing the EEE signal such that the processed EEE signal can be transmitted via transmission media 114.

According to certain aspects, interface module 206 may communicate the processed EEE signal via the second set of wires (S306). In one or more implementations, interface module 206 transmits the processed EEE signal to interface module 208 via transmission media 114. Interface module 208 may process the EEE signal received from interface module 206 such that this signal can be provided to MAC layer 110 of electronic device 108. In this regard, interface module 208 may process the EEE signal such that the processed EEE signal is configured to be transmitted via a third set of wires (e.g., eight wires 204 shown in FIG. 2 as 204a-204h that may interface with MAC layer 110). In some aspects, interface module 208 may process this EEE signal by routing, switching, splitting, duplicating, delaying, demuxing, decoding, descrambling, demodulating, demapping, and/or modifying the EEE signal. For example, interface module 208 may comprise one or more multiplexers, demultiplexers, and/or other suitable components for processing the EEE signal such that the processed EEE signal can be transmitted via eight wires 204. Although interface module 206 of electronic device 102 is described as communicating an EEE signal to interface module 208 of electronic device 108, it is understood that interface module 206 may receive an EEE signal in the same manner as interface module 208.

Method 300 described above may be implemented for different types of EEE communications between electronic devices 102 and 108. According to certain aspects, implementing an EEE communication between electronic devices 102 and 108 may involve initiating an idle communication between electronic devices 102 and 108, verifying the idle communication, refreshing the idle communication, waking up from the idle communication, synchronizing one or more states between the first electronic device and the second electronic device, changing the one or more states, and/or other engaging in other processes to implement the EEE communication between electronic devices 102 and 108.

For example, a symmetric EEE handshaking protocol may be implemented by the exchange of one or more EEE signals using related special coding groups under the EEE standard. In some aspects, the decision of whether an electronic device enters into the LPI mode may be performed at a MAC (e.g., MAC layer 104 or 110), and then communicated to a corresponding PHY (e.g., PHY layer 106 or 112). In one or more implementations, each MAC can request a corresponding PHY to enter into the LPI mode when it does not have any data packet to be sent via the PHY. This request can be implemented by the MAC's proprietary interface. According to the EEE standard, the physical coding sublayer (PCS) transmit function of a PHY may generate LPI signals compared to normal idle signals when the gigabit media independent interface (GMII) (e.g., between the MAC and the PHY) sends the following signals to the PHY: TX_EN=0, TX_ER=1, TXD [7:0]=0000_0001. Inside the PCS transmit function, a new signal, loc_lpi_req, may become TRUE in this case. It may be encoded into a special coding group and sent to its remote link partner (e.g., a receiving PHY). The remote PCS receive function of the receiving PHY may decode the received LPI signals, and assert its rem_lpi_req to be TRUE.

For the symmetric LPI architecture as proposed by the EEE standard, both the transmitting PHY and the receiving PHY may enter into the LPI mode when each PHY detects both loc_lpi_req and rem_lpi_req to be TRUE. In some aspects, each of the MACs can request its corresponding PHY to exit from the LPI mode when its MAC interface signals become: TX_EN=0, TX_ER=0, TXD [7:0]=XX.

The transition from normal mode (e.g., idle or data) to LPI mode, or from the LPI mode back to normal mode may require both receiving and transmitting PHYs to follow the proper LPI states with a full handshaking mechanism, as described in more detail below. Based on the EEE standard, when a receiving PHY detects LPI signaling from its received signals, it may also pass the received signals to its own MAC by the following GMII interface signals: RX_DV=0, RX_ER=1, RXD [7:0]=01. According to various aspects of the subject technology, this MAC interface low power mode request signaling may be extended to any MAC interface associated with reduced pair Ethernet applications. For example, to generate loc_lpi_req as TRUE, a MAC may send its interface signals as: TX_EN=0, TX_ER=1, TXD [n: 0]=1. Upon receiving this special low power idle request signaling from the MAC, the transmit function of a corresponding PHY may generate the loc_lpi_req to be TRUE, which can be properly encoded into a special coding group and sent out as new one or more LPI signals.

While it is possible to use different scrambler and line coding for some reduced pair Ethernet applications, the same scrambler and the coding group defined by the EEE standard may be used for reduced pair Ethernet applications, in accordance with various aspects of the subject technology. For example, for a single pair full-duplex application (e.g., a 250 Mbps data rate), the method and architecture described herein allows for the EEE standard to be complied with for transitions between the normal mode and the LPI mode.

According to the standard, the LPI signals may be generated by a special code group that involves the Sdn[3], and may be mapped to pulse-amplitude modulation (PAM)-3 transmit symbols over pair C. In one or more implementations, the Sdn[3] may be defined as:

$$Sd_n[3] = \begin{cases} Sc_n[3]^{TXD}_n[3], & \text{if } (tx_{enable_{n-2}} = 1) \\ Sc_n[3]^1, & \text{else if } (loc_{lpi_{req}} = \text{TRUE}) \text{ and } (tx_{mode} \neq SEND_Z) \\ Sc_n[3], & \text{else} \end{cases}$$

When an application is utilizing four pairs of wires, for example, this LPI signaling may be enabled over the pair C as a normal 1000Base-T mode. In this case, a receiving PHY may be able to decode the LPI signals from the received symbols from the same pair, and the full handshaking of loc_lpi_req generated by a corresponding MAC can be provided. According to certain aspects, this LPI signaling can still be maintained when utilizing reduced pairs of wires, such as a one pair configuration.

The LPI mode may comprise a refresh state, a quiet state, and a wake state. The refresh state itself can be associated with three different states according to the PHY control state diagram based on the EEE standard. For example, the refresh state may be associated with an update state, a post-update state, and a wait-quiet state. The update state may be used to update PHY internal digital signal processing loops. The post-update state may be used in a symmetric LPI mode to synchronize state transitions between transmitting and receiving PHYs after an update timer is completed. The wait-quiet state may be used in the symmetric LPI mode to synchronize state transitions to the quiet state by both PHYs.

There may be two types of LPI signaling for full handshaking required by the symmetric LPI mode. One is the loc_update_done signal, which may be asserted when a PHY is entering the post-update state. According to the standard, this signal may be encoded in the special coding group associated with Sdn[1], and may be mapped to the PAM-3 transmit symbols over pair B. In one or more implementations, the Sdn[1] may be defined as:

$$Sd_n[1] = \begin{cases} Sc_n[1]^{\wedge}TXD_n1] & \text{if } (tx_{enable_{n-2}} = 1) \\ Sc_n[1]^{\wedge}1 & \text{else if } (loc_{update_{done}} = \text{TRUE and } tx_{mode} \neq SEND_Z) \\ Sc_n[1]^{\wedge}cext\_err_n & \text{else} \end{cases}$$

In one or more implementations, for a four pair application, the same coding group may be used, and the LPI signaling may be sent over pair B during LPI state.

Another LPI signaling is the send_z signaling of a PCS transmit function. The send_z signaling involves sending 0s over all pairs of wires. This may be a special case when the PCS transmit function may only send 0s instead of random PAM-3 symbols. The send_z signaling may be used when a PHY is in the wait-quiet state to synchronize the transition to the quiet state by both receiving and transmitting PHYs. The send_z signaling may be detected by a receiving PHY's PCS receive function, and may cause the receiving PHY to enter into the quiet state from either the post-update state or the wait-quiet state.

Figure 4:
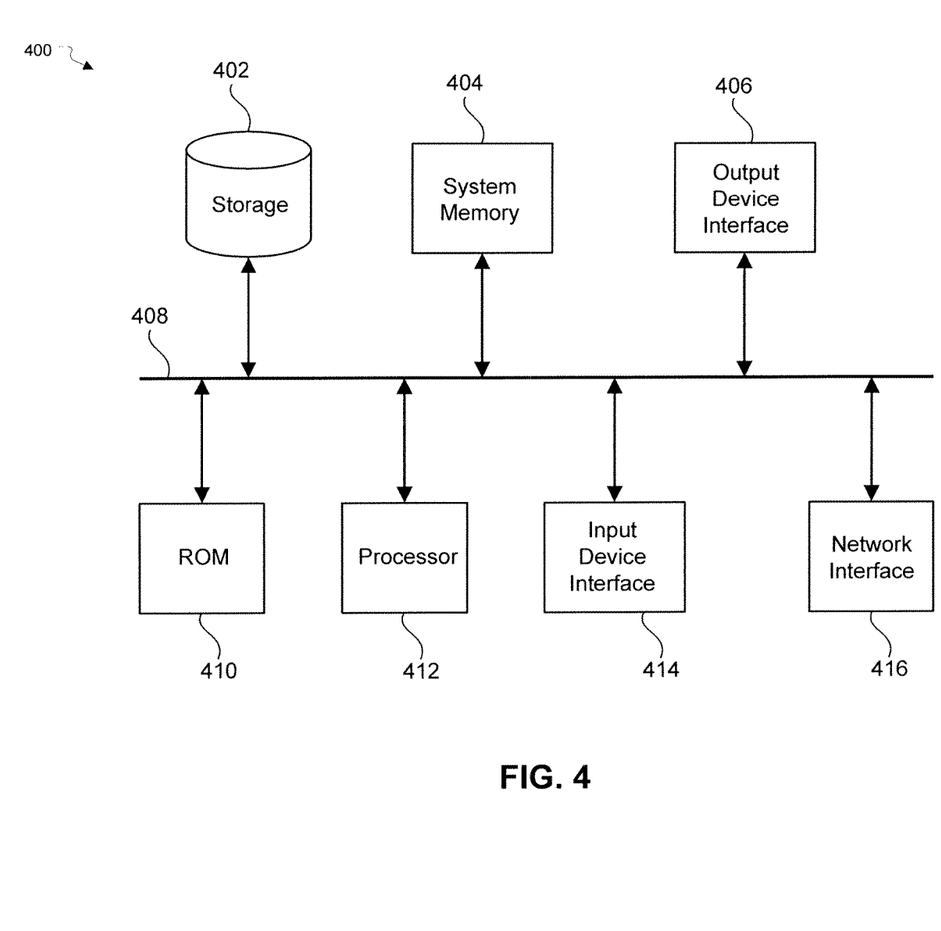
FIG. 4 conceptually illustrates an electronic system with which aspects of the subject technology may be implemented.

FIG. 4 conceptually illustrates electronic system 400 with which aspects of the subject technology may be implemented. Electronic system 400, for example, can be a desktop computer, a laptop computer, a tablet computer, a server, a switch, a router, a base station, a receiver, a phone, a personal digital assistant (PDA), any device that engages in Ethernet communications, or generally any electronic device that transmits signals over a network. Such an electronic system includes various types of computer readable media and interfaces for various other types of computer readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. One or more implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations.

Bus 408 also connects to input and output device interfaces 414 and 406. Input device interface 414 enables a user to communicate information and select commands to the electronic system. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 also couples electronic system 400 to a network (not shown) through network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While one or more implementations described herein may be software processes executed by microprocessors or multi-core processors, the one or more implementations may also be performed by one or more integrated circuits, such as application specific integrated circuits (ASICs) or field programmable gate arrays (FPGAs). Such integrated circuits, for example, may execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although the IEEE 802.3 1000Base-T Energy-Efficient Ethernet (EEE) standard is described herein, the subject technology may be applicable to other suitable communications and/or standards. For example, the subject technology may be used to implement the EEE standard under 10Base-T, 100Base-X, 100Base-TX, or other types of Ethernet communications as described in IEEE 802.3az, all of which are incorporated by reference herein.

According to certain aspects, as used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for implementing an Energy-Efficient Ethernet (EEE) communication, the method comprising:
   receiving, from a media access control (MAC) layer, a plurality of data streams at an input of a first physical layer of a first electronic device via a first set of wires;
   identifying, at the first physical layer, an EEE signal in the plurality of data streams received via the first set of wires, the EEE signal being associated with one of a first EEE signal type or a second EEE signal type;
   combining, at the first physical layer, the plurality of data streams into a combined data stream for transmission via a second set of wires, the second set of wires comprising a single twisted pair of wires, the first set of wires comprising more wires than the second set of wires;
   encoding, at the first physical layer, the combined data stream to include a first indication of the EEE signal when the EEE signal is associated with the first EEE signal type and encoding the combined data stream to include a second indication of the EEE signal when the EEE signal is associated with the second EEE signal type, the first indication and the second indication identifying different low power idle signals; and
   communicating the encoded combined data stream at an output of the first physical layer of the first electronic device via the second set of wires, the encoded combined data stream being communicated in a full-duplex mode from the first physical layer of the first electronic device to a second physical layer of a second electronic device over the single twisted pair of wires.

2. The method of claim 1, wherein the first set of wires comprises eight wires, and wherein the second set of wires comprises two wires.

3. The method of claim 1, wherein the second set of wires are unshielded.

4. The method of claim 1, wherein the EEE signal comprises a plurality of EEE signal portions, and wherein each portion of the plurality of EEE signal portions is received via a respective one of the first set of wires.

5. The method of claim 1, wherein the EEE signal comprises one or more EEE signal portions, and wherein each portion of the one or more EEE signal portions is received via the second set of wires in a time division manner.

6. The method of claim 1, further comprising processing the EEE signal, wherein processing the EEE signal comprises at least one of routing, switching, splitting, duplicating, delaying, muxing, encoding, scrambling, modulating, mapping, or modifying the EEE signal.

7. The method of claim 6, wherein the EEE signal comprises one or more send zero signals, and wherein processing the EEE signal comprises distributing the one or more send zero signals via the second set of wires.

8. The method of claim 1, wherein receiving the plurality of data streams comprises receiving the EEE signal from a media access control layer of the first electronic device, and wherein the encoded combined data stream comprising the first or second indication is communicated to the second electronic device via the second set of wires.

9. The method of claim 1, wherein the first indication of the EEE signal comprises at least one of a low power idle signal, a low power idle initiation request, a low power idle acknowledgment, a low power refresh signal, a low power quiet signal, a low power wake signal, a send zero signal, a signal for synchronizing one or more low power states between the first electronic device and the second electronic device, or a signal for changing the one or more low power states.

10. The method of claim 1, further comprising:
communicating another EEE signal in the full-duplex mode from the second physical layer of the second electronic device to the first physical layer of the first electronic device over the single twisted pair of wires while the encoded combined data stream is being communicated over the single twisted pair of wires.

11. The method of claim 1, wherein:
the first indication is encoded into the encoded combined data stream based on the EEE signal being encoded with a first portion of a physical coding sublayer (PCS) transmit function, and
the second indication is encoded into the encoded combined data stream based on the EEE signal being encoded with a second portion of the PCS transmit function, the second portion being different than the first portion.

12. A method for implementing an Energy-Efficient Ethernet (EEE) communication, the method comprising:
receiving an encoded data stream communicated to an input of a second physical layer of a second electronic device via a first set of wires, the encoded data stream being communicated in a full-duplex mode between a first physical layer of a first electronic device and the second physical layer of the second electronic device over a single twisted pair of wires of the first set of wires;
decoding, at the second physical layer of the second electronic device, the encoded data stream to identify at least one of a plurality of EEE signal types of an EEE signal encoded into the encoded data stream;
separating, at the second physical layer of the second electronic device, the decoded data stream into a plurality of data streams to communicate the decoded EEE signal via a second set of wires from the second physical layer of the second electronic device, the second set of wires comprising more wires than the first set of wires, the decoded EEE signal identifying a low power idle signal; and
providing the decoded EEE signal and the plurality of data streams to the second set of wires.

13. The method of claim 12, wherein the first set of wires comprises two wires, and wherein the second set of wires comprises eight wires.

14. The method of claim 12, wherein the EEE signal comprises one or more EEE signal portions, and wherein each portion of the one or more EEE signal portions is received via a respective one of the first set of wires in a time division manner.

15. The method of claim 12, wherein the EEE signal comprises a plurality of EEE signal portions, and wherein each portion of the plurality of EEE signal portions is transmitted via a respective one of the second set of wires.

16. The method of claim 12, further comprising processing the EEE signal, wherein processing the EEE signal comprises at least one of routing, switching, splitting, duplicating, delaying, demuxing, descrambling, demodulating, demapping, or modifying the EEE signal.

17. The method of claim 12, wherein the EEE signal is received from the first electronic device via the first set of wires, and wherein the decoded EEE signal is provided to a media access control layer of the second electronic device via the second set of wires.

18. A system comprising:
at least one processor circuit configured to:
identify an EEE signal in a plurality of data streams communicated via a first set of wires to a first physical layer of a first electronic device, the EEE signal being associated with one of a plurality of EEE signal types;
combine the plurality of data streams into a combined data stream for transmission via a second set of wires, the second set of wires comprising fewer wires than the first set of wires;
encode the combined data stream to include an indication of the EEE signal associated with the one of the plurality of EEE signal types, the indication identifying a low power idle signal; and
communicate the encoded combined data stream via the second set of wires from the first physical layer of the first electronic device, the encoded combined data stream being communicated in a full-duplex mode between the first physical layer of the first electronic device and a second physical layer of a second electronic device over a single twisted pair of wires of the second set of wires.

19. The system of claim 18, wherein the at least one processor circuit is further configured to process the EEE signal, wherein processing the EEE signal comprises at least one of routing, switching, splitting, duplicating, delaying, muxing, encoding, scrambling, modulating, mapping, or modifying the EEE signal.

* * * * *